United States Patent [19]

Garrity

[11] Patent Number: 5,060,785
[45] Date of Patent: Oct. 29, 1991

[54] ELECTRICALLY-POWERED CONTROL SYSTEM FOR ACCUMULATING CONVEYOR

[75] Inventor: James R. Garrity, Shepherdsville, Ky.

[73] Assignee: The Interlake Companies, Inc., Shepherdsville, Ky.

[21] Appl. No.: 532,040

[22] Filed: Jun. 1, 1990

[51] Int. Cl.⁵ .............................................. B65G 13/06
[52] U.S. Cl. .................................... 198/781; 198/783
[58] Field of Search ........................ 198/781, 783, 460

[56] References Cited

U.S. PATENT DOCUMENTS 4,264,004  4/1981  Harwick ............................. 198/781
4,819,788  4/1989  Van Der Schie ................... 198/781

FOREIGN PATENT DOCUMENTS 110413  4/1989  Japan .................................. 198/781

Primary Examiner—Joseph E. Valenza
Attorney, Agent, or Firm—Theresa Fritz Camoriano

[57] ABSTRACT

A control arrangement for an accumulating conveyor having a plurality of zones includes an electrically-powered sensor in each zone, and a logic circuit associated with each sensor, each logic circuit comprising a first input, a second input from the sensor of its zone, a first output which sends a signal to the activator for that zone, and a second output to send a signal to the input for the next zone.

6 Claims, 3 Drawing Sheets

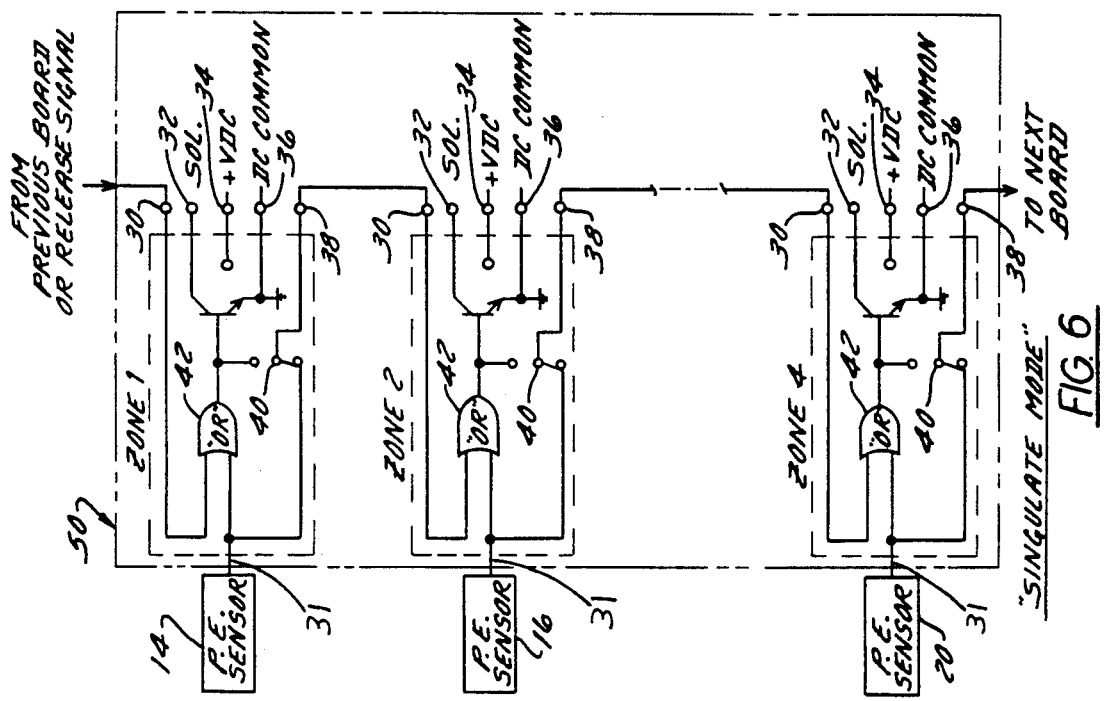
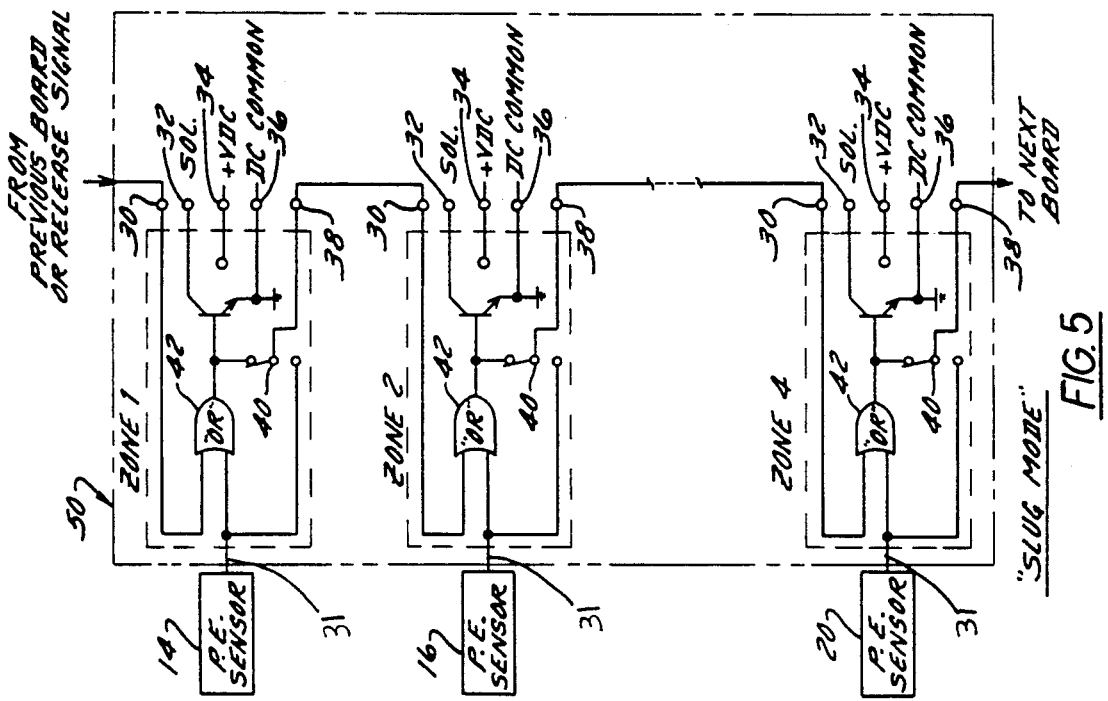

ELECTRICALLY-POWERED CONTROL SYSTEM FOR ACCUMULATING CONVEYOR

BACKGROUND OF THE INVENTION

The present invention pertains to conveyors, and, in particular, to an electrically-powered control system for controlling an accumulating conveyor.

Accumulating conveyors are well known in the art. These conveyors are divided into zones, and various types of controls are used to control the driving of the zones. The purpose of these types of conveyors is to convey articles smoothly without the articles bumping into each other and crushing each other when there is a back-up or delay in the system. Thus, when there is a back-up in the system, some zones will stop driving and will permit the articles to accumulate on them until the back-up is cleared and the articles can again be conveyed along the conveyor's path. In the past, mechanical controls have primarily been used in these systems. For example, a sensor bar will be located along the conveyor, and, when the bar is depressed, it will close a valve or trigger some other type of mechanical control which will cause the drive for the next zone to be disengaged. These mechanical systems have several drawbacks. For example, if the article is not heavy enough to depress the sensor bar or has an irregularly-shaped bottom which does not depress the sensor bar, the system will not sense that the article is present and will not cause the next zone to stop driving. Also, the mechanical systems include many moving parts which require a considerable amount of maintenance.

Electronic controls are also known. These systems sense the presence of an article by electronic means, such as by means of a photo-electric sensor. The use of a photo-electric sensor instead of a mechanically-operated sensor bar eliminates the problem of the system failing to be triggered if the article is not heavy enough. The electronically-operated system using a photo-electric sensor will sense the presence of any article which stops the transmission of light. The photo-electric-controlled systems now being used include a central processing unit, and each photo-electric sensor communicates with the central processing unit or "brain" of the system. The central processor makes the decision as to which zones should be driven and, in turn, communicates with a solenoid in each zone, telling each solenoid whether to engage or disengage the drive for its zone. This type of system requires extensive wiring and a sophisticated central processing unit. It also requires fairly sophisticated diagnostics to analyze the location of a problem in the event that there is some malfunction in the system.

SUMMARY OF THE INVENTION

The object of the present invention is to provide a very simple electronic control system for accumulating conveyors which permits an inexpensive electronic sensor to be used to control the system.

Another object is to eliminate the need for a central processing unit and sophisticated diagnostics that were present in previous electrically-controlled conveyors.

Another object is to provide for very simple installation of a control system including very little wiring.

The present invention achieves these objectives by providing a very simple logic arrangement associated in a circuit with each electronic sensor and then having each circuit communicate with the circuit before and after itself to control the system. This is much simpler and less expensive than prior art systems with central processing units, eliminates expensive installation and maintenance problems, and, because of its simplicity, provides fewer possibilities for problems to arise than in prior art systems. If a problem does arise, it is very simple to diagnose and correct in this system.

BRIEF DESCRIPTION OF THE DRAWINGS

FIG. 5 is a schematic diagram showing the logic for the control circuitry of the present invention set for the "slug mode" operation;

FIG. 6 is a schematic diagram showing the logic for the control circuitry of the present invention set for the "singulate mode" of operation.

DESCRIPTION OF THE PREFERRED EMBODIMENT

Figure 1:
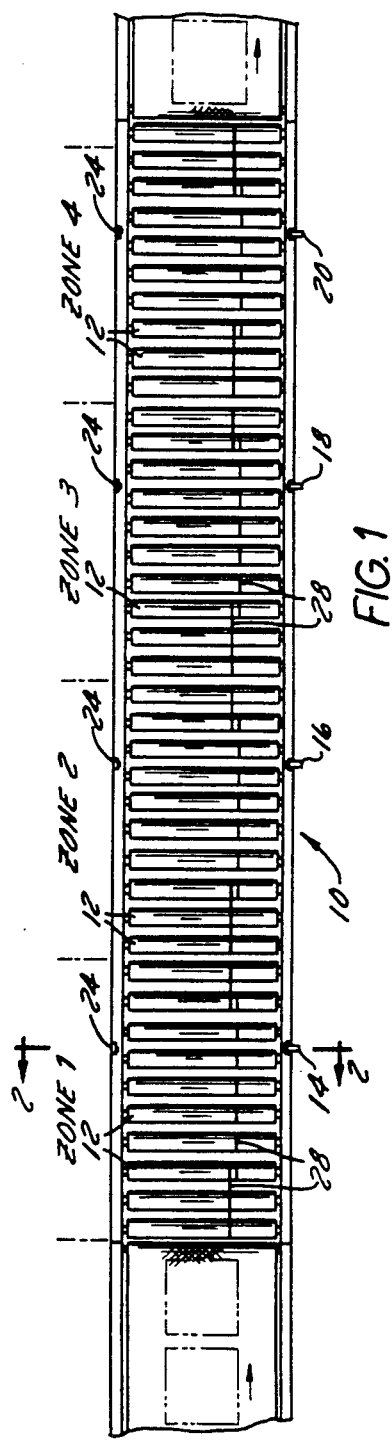
FIG. 1 is a schematic plan view of an accumulating conveyor made in accordance with the present invention.
Figure 2:
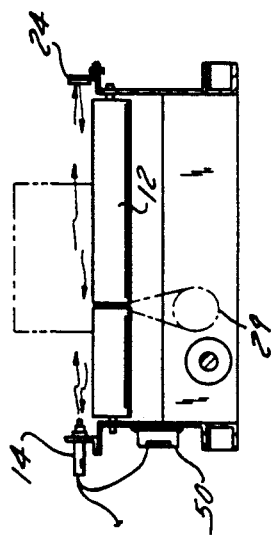
FIG. 2 is a view along the section 2—2 of FIG. 1.
Figure 2A:
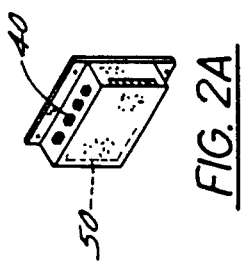
FIG. 2A is a perspective view of the encapsulated circuit board which controls four zones of the conveyor.

FIG. 1 is a schematic view of an accumulation conveyor 10, which is divided into zones 1, 2, 3, and 4. This particular accumulation conveyor 10 is made up of a number of driven rollers 12, with a given number of rollers 12 in each zone. The means for driving the rollers is not important to the present invention, but various driving means for accumulation conveyors are well known in the art. FIG. 2 shows that the embodiment shown here is driven by a plurality of 0-rings 28 mounted on a drive shaft 29, with each 0-ring also wrapping around its respective roller 12. Of course, many other types of accumulation conveyors could be used in conjunction with the present invention. In each zone is an electrically-powered sensor, which, in the present embodiment, is a photo-electric cell 14, 16, 18, 20, respectively. Each photo-electric cell 14, 16, 18, 20, is mounted on the frame of the conveyor 10 and includes a transmitter 22 which emits light that is directed across the conveyor. On the other side of the conveyor, directly opposite each photo-electric cell, is a reflector 24, which reflects the light back to the photo-electric cell. Each photo-electric cell 14, 16, 18, 20 includes an electrically-powered sensor 26, which senses whether or not the light has been reflected back from the reflector 24. When the light is reflected back, it means that no article is present. When no light is reflected back, that indicates that an article has come between the reflector 24 and the sensor 26, breaking the light beam.

Figure 4:
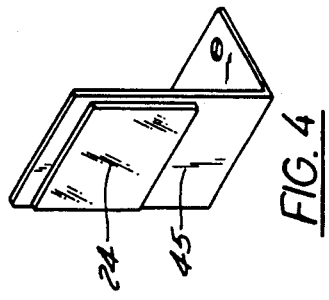
FIG. 4 is a perspective view of the reflector.
Figure 3:
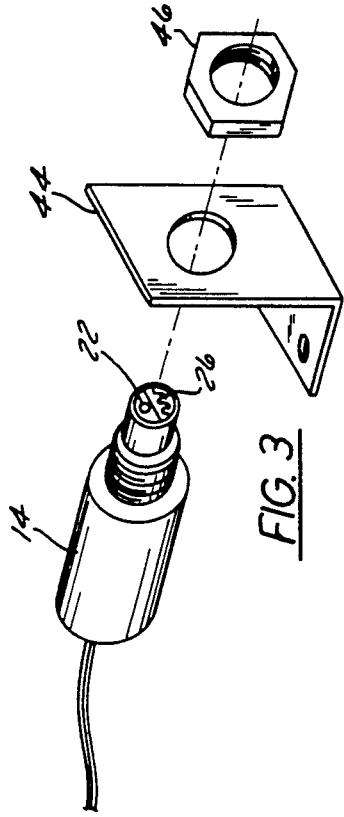
FIG. 3 is a perspective view of the photo-electric cell and its mounting bracket.

FIGS. 2-4 show the mounting arrangement for the photo-electric cell 14 and the reflector 24. The photo-electric cell housing 14 is mounted on a bracket 44 by means of a nut 46. A portion of the photo-electric cell housing 14 extends through a hole in the bracket 44 and is held in place by the nut 46, which is threaded onto the housing 14. The transmitter 22 and sensor 26 of the photo-electric cell 14 project through the bracket 44 so they have a clear view of the reflector 24, which is mounted on another bracket 45. The two brackets 44, 45 are bolted onto their respective side rails of the conveyor 10 so that the transmitter 22 and sensor 26 lie directly opposite the reflector 24. Alternatively, the transmitter 22 and reflector 24 may lie at an angle to each other, as long as the transmitter 22 and sensor 26 are directed toward the reflector.

While the present embodiment describes a certain type of electrically-powered sensor, there are many other types of electrically-powered sensors that could be used in the present invention. Other types of photo-electric cells are known, and some sensors are known which operate based on sound waves which bounce off of the package or off of the other side of the conveyor. Any of these or other electronically-powered sensing devices could be used in conjunction with the present invention.

An electrical circuit is associated with each electrically-powered sensor 26 and includes the input, output, and logic shown in FIGS. 5 and 6. This logic circuitry may be located inside the respective photo-cell housings 14, 16, 18, 20, or it may be located on a separate circuit board mounted near the electrically-powered sensor 26. In the present embodiment, the circuitry for four electrically-powered sensors 26 is mounted on a single circuit board 50, which is mounted on the side rail of the conveyor in the area of the four zones which it controls. We will refer first to FIG. 5, which shows the logic in one of these circuit boards 50.

As was stated earlier, there is one circuit defined for each electronically-powered sensor 26, or, in other words, there is one circuit defined for each zone of the conveyor. In each circuit, there is a first input 30, which is connected to the previous circuit. In the case of the circuit for zone 1, where there is no previous circuit, the input 30 will come from a signal that is generated specifically to control the system. Each circuit also has a second input 31, which comes from the electrically-powered sensor 26 of its zone, an output 32 leading to a solenoid or other activator which activates the drive for the zone, two power connections 34, 36 for supplying power to the photo-electric cell 14, 16, 18, or 20, and an output 38, which is connected to the input 30 of the next zone. Of course, in the last zone, the output 38 is not necessary. However, it is preferred that all the circuit boards be identical for the sake of simplicity. Thus, in this system, there is a connection between each electrically-powered sensor 26 and the circuit for its zone, a connection between each solenoid or other activator and the circuit for its zone, and connections between each zone and the preceding and succeeding zones. Note that there is no wire leading to or from any central processing unit as in other electrically-powered control arrangements, because there is no central processing unit in this system. All the control logic is located inside the circuit boards mounted on the conveyor frame in the area of the zones which are controlled by the circuit boards. Thus, this control system is relatively inexpensive as compared with the cost of a central processing unit. Also, the installation of the logic in this system is as simple as installing the electrically-powered sensors and the circuit boards in their respective zones and plugging them together. Installation does not require a wiring network to provide communication between each zone and a central processing unit as in the prior art.

Figure 7:
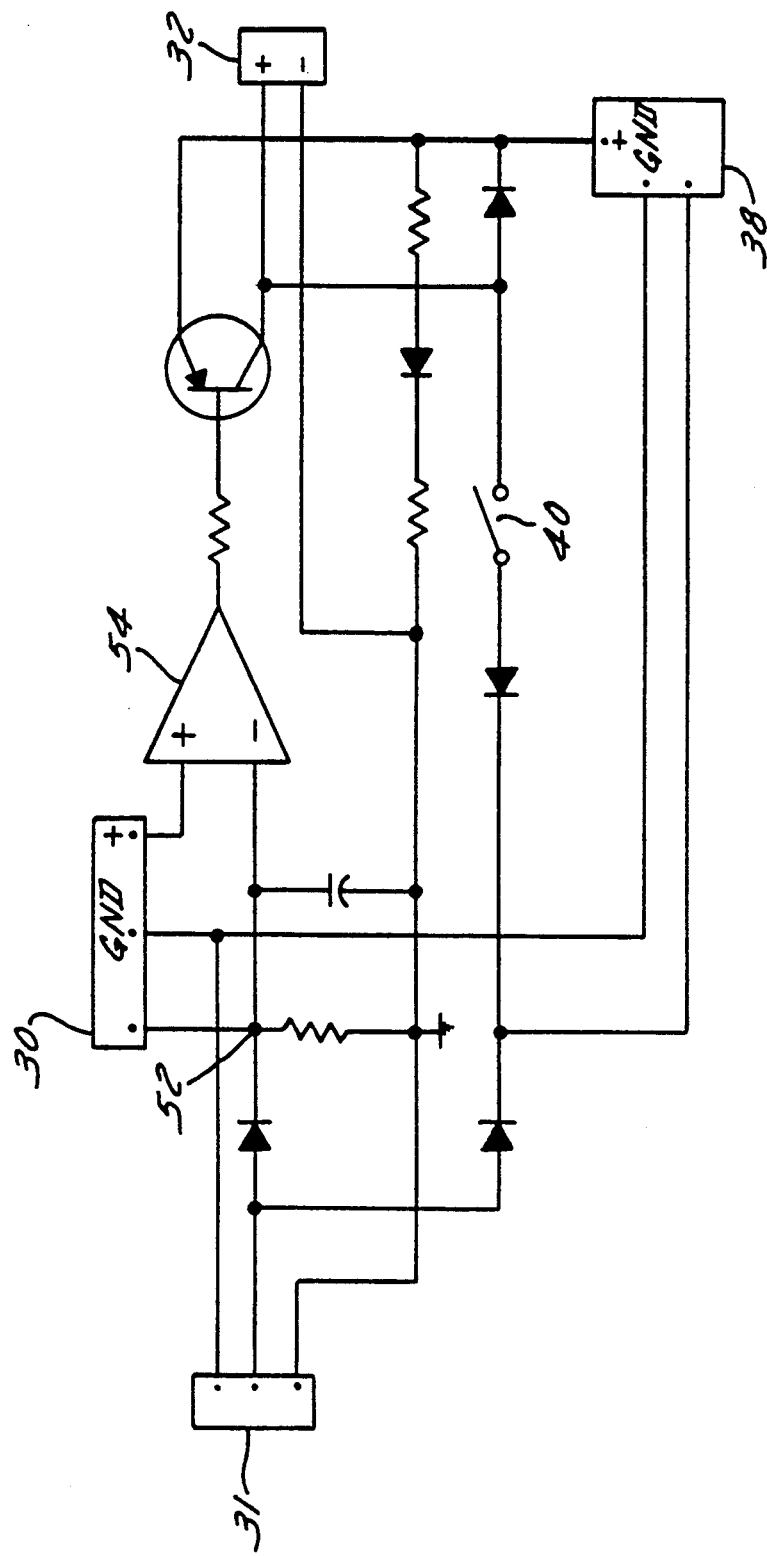
FIG. 7 is an electrical schematic diagram for one zone.

There is a switch 40 in each circuit which determines what signal will go to the output 38 for that circuit. The signal from the output 38 of each photo-electric circuit is then transmitted to the input 30 of the next circuit. Each logic circuit associated with a photo-electric cell also includes circuitry to perform an "or" function as shown at 42. There are many ways to perform the "or" function electronically. An example is shown in FIG. 7, in which the signal 30 from the previous zone and the signal 31 from the photo-electric sensor 26 are combined at the point 52, and a chip 54 compares that signal with some threshold voltage. If the signal is greater than the threshold voltage, the signal will pass through the chip 54. The threshold is set so that, if there is a signal from either the photo-electric sensor 26 or from the previous zone, the signal will pass through the chip 54.

Referring now to FIGS. 5 and 6, the "or" function 42 receives the signal from the input 30 (which comes from the previous zone) and the signal from the input 31 (which comes from the photo-electric sensor in its zone), and, if a signal is received from either of those sources, the "or" function 42 passes the signal on to the activator output 32 and to the switch 40. If no signal is received at the input 30 and an article is in the zone so as to block the light and prevent the photo-electric sensor 26 from sending a signal through the input 31, the "or" function 42 receives no signal and passes no signal on.

If the switch 40 is in its first position, as shown in FIG. 5, it connects the output of the "or" function 42 with the output 38 which goes to the input 30 of the next board, and, if it is in its second position, as shown in FIG. 6, it connects the signal from the photo-electric sensor 26 with the output 38 to the next board. The first position, as shown in FIG. 5, creates a "slug mode" type of control for the system, and the second position, as shown in FIG. 6, creates a "singulate mode" type of control. These modes of control will now be described.

"Slug Mode"

In FIG. 5, all the switches 40 are in the first position, which puts the conveyor 10 in the slug mode of operation. When the conveyor is operating normally, a release signal will be sent to the input 30 of the control circuit for zone 1. The release signal will pass through the "or" function 42 in zone 1, through the switch 40 of zone 1, to the output 38 of zone 1, to the input 30 of zone 2, through the "or" function 42 of zone 2, through the switch 40 of zone 2, to the output 38 of zone 2, and so forth throughout the control circuits of all the zones. As long as the "or" function 42 of each zone receives a signal from somewhere, it will transmit the signal through to its solenoid through its output 32, which causes its zone to be driven. Thus, in this mode of operation, as long as the release signal is on, all the zones of the conveyor will be driven.

When there is a back-up in the conveyor ahead of the accumulation portion so that the conveyor needs to begin to accumulate, the release signal is turned off, either by the operator or by some automatic control (not shown). Then, zone 1 will receive a signal only when there is no article present in zone 1. When an article arrives in zone 1, blocking the transmission of light, the photo-electric sensor 26 in zone 1 will not sense any return of light from its reflector, and it will stop sending a signal to its "or" function 42. Since there is no signal coming from the input 30 in zone 1 and no signal from the photo-electric sensor in zone 1, the "or" function in zone 1 receives no signal and therefore passes no signal to its output 32 to the solenoid, thereby causing zone 1 to stop driving. Since no signal is passing through the "or" function in zone 1, zone 1 sends no signal through its switch 40 to its output 38 to the input 30 of zone 2.

Zone 2 and all the zones after zone 2 will continue driving as long as zone 2 continues to receive a signal from its photo-electric sensor 26 indicating that no article is present in zone 2. However, when an article reaches zone 2, the signal from the photo-electric sensor 26 of zone 2 will stop. Since now the "or" function in zone 2 is not receiving any signal from its input 30 from the previous zone and is not receiving any signal from its own photo-electric sensor 26, it has no signal to pass on to its output 32 to its solenoid. The solenoid in zone 2 will then be deactivated, and zone 2 will stop driving.

At this point, zone 3 and the zones after zone 3 will continue to be driven as long as zone 3 is receiving a signal from its own photo-electric circuit, which passes on through the remaining zones. However, when an article reaches zone 3, the "or" function 42 in zone 3 will stop receiving any signal, and it will stop sending a signal to its own solenoid, causing zone 3 to stop driving. This stopping of zones will thus progress throughout the zones, with articles accumulating in each subsequent zone until the operator turns on the release signal in zone 1.

When the release signal is turned on in zone 1, indicating that the blockage in front of the accumulating conveyor 10 is gone, the "or" function 42 in zone 1 will begin receiving a signal, causing it to activate its solenoid and start its zone driving. This signal is immediately passed on through the "or" function 42 in each succeeding zone, thus starting up at once all the zones which had previously been stopped. In this way, the articles will be passed together in a "slug" mode through the accumulating conveyor 10. In other words, a whole group of articles or "slug" of articles in successive zones will move together as a unit along the conveyor. This type of "slug" mode operation has the advantage that it can pass more articles through the accumulator in a given period of time than can an accumulator operating in the "singulate" mode, which will be described later.

This "slug" mode of operation is not as desirable in a mechanically-operated system, because, in a mechanically-operated system, the mechanical sensors must be properly triggered in order to stop the zone. If something fails in the system, the zone will continue driving, which could cause packages to stack up and crush each other. In the electrically-controlled system, the only way the zone can drive is if the electrically-powered sensors are properly receiving a signal. If the electrically-powered sensors malfunction, they will most likely cause the conveyor to stop driving, which will not damage the packages being conveyed. Stated most simply, in a mechanical system, the zone will be driven unless it receives a control signal to stop. In an electrically-controlled system, the zone will stop unless it receives a control signal to drive. The latter system is, therefore, less likely to create a situation in which a malfunction of the system causes packages to pile up and crush each other.

"Singulate Mode"

Looking now at FIG. 6, everything is identical to FIG. 5, except that the switch 40 in each zone has been switched to its second position, indicating the "singulate" mode of operation. When the zones are set up in the "singulate" mode, the input 30 of each circuit simply receives a signal from the photo-electric sensor 26 in the previous circuit, so it is looking one zone ahead to decide whether it will drive or stop.

For example, assuming the release signal is off in zone 1, zone 1 will be driven as long as it receives a signal from its own photo-electric sensor 26, because the signal from the photo-electric sensor 26 of zone 1 will enter the input 31 of zone 1 and will pass through the "or" function 42 of zone 1 and be transmitted through the output 32 to the solenoid of zone 1, causing zone 1 to be driven. Zone 2 receives at its input 30 the output 38 from zone 1, which was generated from the photo-electric sensor 26 in zone 1. If there is no article in zone 1, the signal from the photo-electric sensor 26 in zone 1 will go through the output 38 of zone 1 and be received by the "or" function 42 in zone 2, thereby causing zone 2 to be driven whether there is an article in zone 2 or not.

Assuming that there is an article in zone 1, zone 2 will receive no signal from the output 38 in zone 1, because the photo-electric sensor 26 in zone 1 is not producing a signal to transmit to its output 38. Zone 2 will continue receiving a signal from its own photo-electric sensor and will continue driving as long as no article has reached the sensor 26 of zone 2. Now, if zone 1 has an article and zone 2 receives an article, zone 2 will stop driving, because it is neither receiving an input signal from the previous zone nor from its own photo-electric sensor 26. Its "or" function 42 is receiving no signal and will pass no signal on to its solenoid, causing its solenoid to be deactivated, thereby stopping the driving in zone 2.

Then, when an article arrives in zone 3, zone 3 will stop driving, because its "or" function 42 is receiving no input signal through the input 30 from the previous zone, and it is receiving no signal from its own photo-electric sensor 26. In this way, each zone in succession will stop driving, as it senses an article in the zone ahead of it and an article in its own zone. When the obstruction is removed, the operator will activate the release signal to zone 1, which will cause zone 1 to begin driving, since its "or" function 42 is receiving that signal at the input 30 and passing it on to the solenoid in zone 1. Zone 2 will not begin driving, however, until the article in zone 1 has cleared the photo-electric sensor 26 in zone 1 so as to begin sending a signal to zone 2. Zone 3, in turn, will not begin driving until it receives a signal from the photo-electric circuit in zone 2, indicating that the article in zone 2 has cleared the sensor 26 in zone 2. This process will continue from zone to zone until all the zones are driving again.

This "singulate" mode is less efficient in conveying articles than is the "slug" mode, because, when the accumulator begins to unload the articles that have accumulated, it creates a one-zone gap between the articles, spreading them out so that fewer articles leave the accumulator in a given period of time than would be the case with the slug mode operation, in which all the articles begin moving as a unit. However, even though these inefficiencies are present, the operator may still choose the "singulate" mode, because, in the singulate mode, there is less likelihood of the cartons drifting together and touching each other. Also, the gap that is created in the singulate mode may be considered an advantage in the event that it is desirable for an operator to insert cartons into the gaps. In other words, the gaps created by the singulate mode of operation could be used to create an input point at which articles could be added to the conveyor from the side.

It may also be advantageous to put most of the zones into the slug mode of operation and have singulate zones located at intervals along the accumulation conveyor. It has been found that, in a long accumulation conveyor operating at high speeds in slug mode, the articles tend to drift together, creating some backline pressure. The addition of singulate-mode-controlled zones at intervals along the conveyor creates one-zone gaps and thereby reduces this drifting problem. Another way in which singulate-zones and slug-zones could be combined in a useful way would be to use a group of a few contiguous singulate-zones in an otherwise slug-mode accumulation conveyor in order to create gaps into which articles could be added to the conveyor, as was described above in the discussion concerning the singulate mode. Thus, the use of a combination of slug mode and singulate-mode zones can be very beneficial. In any event, the ability to switch each zone from one mode to another with just the flip of a switch makes the system very adaptable.

In this manner, a control is provided for an accumulating conveyor which takes advantage of electric control technology for controlling the driving of the zones without requiring any central processing unit or any extensive wiring as are required by the prior art. If any electrically-powered sensor or any circuit board becomes faulty, it will be a simple matter to remove it and replace it, thereby correcting any problem with the system.

In the embodiment shown here, each circuit board includes four circuits, one for each of four zones, and each circuit board is completely encapsulated in a polymeric material to protect the circuitry. Connectors for power input, input from the sensors 26, input from the previous board, output to the activators, and output to the next circuit board are all embedded in the polymeric material, and the switch levers for the four switches 40 are also embedded in the polymeric material, so installation requires only that the circuit boards be mounted and the inputs and outputs be plugged in. FIG. 7 shows the circuitry for one zone out of the four zones that are on the single circuit board 50. It shows the input 30 and the output 38 for that zone as including connectors. In fact, only the circuit for the first zone on the board will have an actual connector for the input 30, and only the circuit for the last zone on the board will have the connector for the output 38 to the next zone. The connections between the four circuits in the circuit board will be hard-wired into the circuit board itself.

It will be obvious to those skilled in the art that modifications could be made to the embodiment described above without departing from the scope of the present invention.

What is claimed is:

1. A control system for an accumulating conveyor having a plurality of accumulation zones, and an activator for each zone, comprising:
   an electrically-powered sensor for each accumulation zone of the conveyor; and
   a logic circuit associated with each electrically-powered sensor, each logic circuit having control signal inputs and control signal outputs, consisting only of:
   a. a first control signal input;
   b. a second control signal input coming from the electrically-powered sensor with which that logic is associated;
   c. a first control signal output which is adapted to transmit a signal to the activator for that zone; and
   d. a second control signal output which is adapted to transmit a signal to the input for the next zone.

2. A control system for an accumulating conveyor having a plurality of accumulation zones, and an activator for each zone, comprising:
   an electrically-powered sensor for each accumulation zone of the conveyor; and
   a logic circuit associated with each electrically-powered sensor, each logic circuit comprising:
   a. a first input;
   b. a second input coming from the electrically-powered sensor with which that logic is associated;
   c. a first output which is adapted to transmit a signal to the activator for that zone; and
   d. a second output which is adapted to transmit a signal to the input for the next zone, and further comprising an "or" function in each logic circuit, wherein said "or" function receives signals from the first and second inputs and, if there is a signal in either of the inputs, transmits a signal to the first output for that zone i order to cause the activator for that zone to operate.

3. A control system for an accumulating conveyor as recited in claim 2, wherein said logic circuit further comprises a switch having at least two positions, wherein, in its first position, the switch causes the output from the "or" function in its zone to be transmitted to the second output of its zone, thereby establishing a "slug" mode of control, and, in its second position, the switch connects the input from its zone's photo-electric sensor to the second output of its zone, thereby establishing a "singulate" mode of operation for the accumulator.

4. A control system for an accumulating conveyor as recited in claim 1, wherein said logic circuit for each zone is completely encapsulated in a polymeric material, with connectors for power, sensors, and activators built in.

5. A control system for an accumulating conveyor as recited in claim 1, wherein four of said logic circuits are connected together as a unit which is completely encapsulated in a polymeric material, with connectors for power, sensors, and activators built in.

6. A control system for an accumulating conveyor as recited in claim 2, wherein said electrical sensor provides an electrical current as a signal input to the logic circuit when it senses an absence of product in its path, and, when it senses the presence of a product in its path, it provides no electrical current as a signal input, so that, if for any reason the electrical sensor were to fail to provide a signal, the logic circuit would treat that condition as if a product were present in that zone.

* * * * *